(12) United States Patent
Hendley et al.

(10) Patent No.: US 9,536,242 B2
(45) Date of Patent: *Jan. 3, 2017

(54) PRINTER CREDIT MANAGEMENT

(71) Applicant: HEWLETT-PACKARD DEVELOPMENT COMPANY, L.P., Houston, TX (US)

(72) Inventors: Odhran Hendley, Bray (IE); Eduardo Macias, Clonee (IE); Jon Rittgers, Celbridge (IE); Mark Loughlin, Kilanerin (IE); Michael Mulloy, Co. Dublin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,845

(22) Filed: May 4, 2015

(65) Prior Publication Data
US 2015/0235224 A1 Aug. 20, 2015

Related U.S. Application Data

(63) Continuation of application No. 12/721,434, filed on Mar. 10, 2010, now Pat. No. 9,082,139.

(51) Int. Cl.
G06F 17/00 (2006.01)
G06Q 20/40 (2012.01)
G06Q 30/02 (2012.01)
G06Q 20/28 (2012.01)
G06F 3/12 (2006.01)

(52) U.S. Cl.
CPC ......... *G06Q 20/4033* (2013.01); *G06F 3/1239* (2013.01); *G06F 3/1259* (2013.01); *G06F 3/1273* (2013.01); *G06Q 20/28* (2013.01); *G06Q 30/0283* (2013.01)

(58) Field of Classification Search
USPC .................. 235/375, 380, 381, 383
See application file for complete search history.

(56) References Cited

U.S. PATENT DOCUMENTS

| 5,383,129 A | 1/1995 | Farrell |
| 5,495,411 A | 2/1996 | Ananda |
| 6,603,975 B1 | 8/2003 | Inouchi et al. |

(Continued)

FOREIGN PATENT DOCUMENTS

| KR | 1020020012299 A | 2/2002 |
| KR | 1020020079446 A | 10/2002 |

(Continued)

OTHER PUBLICATIONS

International Search Report & Written Opinion received in PCT Application No. PCT/US2013/051855, Apr. 29, 2014, 15 pages.

(Continued)

*Primary Examiner* — Ahshik Kim
(74) *Attorney, Agent, or Firm* — HP Inc. Patent Department

(57) ABSTRACT

A printer credit management method is disclosed, the method includes receiving a code at a printer. From the code, a printer identifier and a credit value are discerned. It is determined if the printer identifier corresponds to a unique identifier assigned to the printer. Only upon a positive determination, a credit balance maintained by the printer is updated to include the credit value.

20 Claims, 7 Drawing Sheets

(56) References Cited

U.S. PATENT DOCUMENTS

| | | |
|---|---|---|
| 6,650,433 B1 | 11/2003 | Keane et al. |
| 6,712,266 B2 | 3/2004 | Bartley et al. |
| 6,801,333 B1 | 10/2004 | Weiss |
| 6,854,839 B2 | 2/2005 | Collier et al. |
| 7,043,523 B2 | 5/2006 | Haines et al. |
| 7,065,497 B1 | 6/2006 | Brewster et al. |
| 7,113,299 B2 | 9/2006 | Suzuki et al. |
| 7,136,177 B1 | 11/2006 | Bryan et al. |
| 7,319,535 B2 | 1/2008 | Cherry et al. |
| 7,526,555 B2 | 4/2009 | Shahindoust |
| 7,545,528 B2 | 6/2009 | Takabayashi et al. |
| 7,660,539 B2 | 2/2010 | Tye et al. |
| 7,765,580 B2 | 7/2010 | Vandergeest et al. |
| 8,051,012 B2 | 11/2011 | Ramanathan et al. |
| 8,296,202 B2 | 10/2012 | Matsuda et al. |
| 9,082,139 B2 * | 7/2015 | Hendley ............... G06Q 30/06 235/375 |
| 2002/0131079 A1 | 9/2002 | Forbes et al. |
| 2002/0152183 A1 | 10/2002 | Soares et al. |
| 2003/0011809 A1 | 1/2003 | Suzuki et al. |
| 2003/0074312 A1 | 4/2003 | White |
| 2003/0078863 A1 | 4/2003 | Pilu |
| 2003/0187808 A1 | 10/2003 | Alfred et al. |
| 2004/0056889 A1 | 3/2004 | Katano |
| 2004/0138945 A1 | 7/2004 | Adkins et al. |
| 2004/0196491 A1 | 10/2004 | Uchino |
| 2004/0201613 A1 | 10/2004 | Foster et al. |
| 2004/0215580 A1 | 10/2004 | Pilu et al. |
| 2005/0289054 A1 | 12/2005 | Silverbrook et al. |
| 2006/0069615 A1 | 3/2006 | Gupta |
| 2006/0074816 A1 | 4/2006 | Hibara et al. |
| 2006/0271424 A1 | 11/2006 | Gava et al. |
| 2007/0188530 A1 | 8/2007 | Garrana et al. |
| 2007/0283447 A1 | 12/2007 | Hong et al. |
| 2008/0310875 A1 | 12/2008 | Rahman et al. |
| 2009/0016743 A1 | 1/2009 | Tye et al. |
| 2009/0016748 A1 | 1/2009 | Ferlitsch |
| 2009/0030837 A1 | 1/2009 | Knodt |
| 2009/0070243 A1 | 3/2009 | Buck et al. |
| 2009/0089192 A1 | 4/2009 | Ferlitsch |
| 2009/0265286 A1 | 10/2009 | Nagarajan |
| 2010/0053673 A1 | 3/2010 | Oba |
| 2011/0220711 A1 | 9/2011 | Hendley et al. |
| 2011/0235113 A1 | 9/2011 | Ohara |
| 2012/0203618 A1 | 8/2012 | Roever |
| 2012/0307263 A1 | 12/2012 | Ichikawa et al. |
| 2012/0327449 A1 | 12/2012 | Lee |
| 2013/0006871 A1 | 1/2013 | Stefik et al. |
| 2013/0010333 A1 | 1/2013 | Anand et al. |
| 2013/0073391 A1 | 3/2013 | Young |
| 2013/0110744 A1 | 5/2013 | Hendley et al. |
| 2014/0063514 A1 * | 3/2014 | Roy ............... G06Q 10/10 358/1.9 |
| 2014/0215584 A1 | 7/2014 | Webb et al. |

FOREIGN PATENT DOCUMENTS

| | | |
|---|---|---|
| KR | 100812694 B1 | 3/2008 |
| WO | WO-0076204 A1 | 12/2000 |
| WO | WO-0102946 A1 | 1/2001 |
| WO | WO-0102948 A1 | 1/2001 |
| WO | WO-0184429 A1 | 11/2001 |
| WO | WO-2010056739 A2 | 5/2010 |
| WO | WO-2011115987 A2 | 9/2011 |

OTHER PUBLICATIONS

Kalochristianakis, M. et al., The Concept and Design of an Open, Integrated Print Charging System, (Research Paper), Panhellenic Conference on Informatics, Sep. 30-Oct. 2, 2011, pp. 292-296.

Staples, "Price List," Copy and Print, Jan. 17, 2009, <http://web.archive.org/web/20090117091458/http://www.staplescopyandprint.ca/Downloads/BrochureENG_pricelist.pdf> (4 pages).

Wikipedia, "Digital wallet," Jul. 21, 2009, <http://web.archive.org/web/20090721024634/http://en.wikipedia.org/wiki/Digital_wallet> (2 pages).

Wikipedia, "Electronic bill payment," Aug. 5, 2009, <http://web.archive.org/web/20090805062547/http://en.wikipedia.org/wiki/Electronic_bill_payment> (2 pages).

Wikipedia, "Electronic money," May 3, 2009, <http://web.archive.org/web/20090503070004/http://en.wikipedia.org/wiki/Electronic_money> (3 pages).

Wikipedia, "PayPal," Oct. 16, 2009, <http://web.archive.org/web/20091016145237/http://en.wikipedia.org/wiki/PayPal> (7 pages).

Wikipedia, "Prepaid mobile phone," Nov. 12, 2009, <http://web.archive.org/web/20091112171924/http://en.wikipedia.org/wiki/Prepaid_mobile_phone> (6 pages).

Xerox, "Xerox eConcierge Supplies Assistant Technical Information," 2012, available at https://www.xeroxdirect.ca/include/XDEFS-01C.PDF (4 pages).

* cited by examiner

PRINTER CREDIT MANAGEMENT

CROSS REFERENCE TO RELATED APPLICATIONS

This is a continuation of U.S. application Ser. No. 12/721,434, filed Mar. 10, 2010, which is hereby incorporated by reference.

BACKGROUND

Printers utilize consumables such as ink and toner colorants. These consumables are often supplied via replaceable cartridges. The up-front cost or purchase price of a cartridge impacts not only the consumer's decision to purchase the consumable but also impacts the decision to purchase the given printer. Two approaches have been developed to attract consumers. The first focuses on the short term by lowering a cartridge's purchase price to attract more budget minded consumers. The second focuses on the long term and reduces the printer's overall cost of ownership, that is, the cost per printed page.

To lower the purchase price, suppliers lower the colorant fill of a cartridge. While this lowers the purchase price, it increases the overall cost per printed page and causes more frequent cartridge purchases. To lower the cost per printed page, suppliers increase cartridge colorant levels. This decreases both the cost per printed page and replacement frequency, but the increase in purchase price detracts some budget oriented consumers.

Limited to these two approaches, consumers sacrifice either the cost per printed page or the cartridge purchase price. Furthermore, neither approach addresses circumstances where a third party desires to utilize the consumer's printer. Regardless of the type of cartridge purchased, consumers remain cost conscious and, thus, adverse to others printing to their devices.

DRAWINGS

DETAILED DESCRIPTION

Introduction: Various embodiments described below were developed to lower the purchase price of printer consumables without sacrificing the cost per printed page. In particular, various embodiments allow consumers to pay for ink and toner as those colorants are consumed. As an added benefit, a consumer can be compensated for another's use of their printer.

As will be described in greater detail, a printer maintains a credit balance. The printer deducts from that balance as pages are printed. The credit balance is increased by supplying the printer with a code that uniquely identifies the printer and specifies the amount of credit to be added. The added credit can be purchased or transferred from another printer. The code can be supplied electronically via a wired or wireless connection or entered manually, for example, through the printer's user interface. Manual entry allows the printer to function without ever needing a network connection.

The term code as used herein refers to a sequence of letters, numerals and/or symbols capable of being deciphered to discern a definite meaning. Here that meaning includes a credit value to be added to a printers credit balance. The credit value may, for example, be measured in currency or in a quantity of a given consumable such as ink or toner. To help prevent fraud, the code can also be deciphered to discern security information such as a printer identifier and one or more transaction identifiers. The printer identifier, for example, may be a serial number, e-mail address, or other data that can distinguish a particular printer from other printers. A transaction occurs when a code is generated. That transaction may include payment for the credit value represented by the code. Each such transaction can be distinguished by its transaction identifier. Transaction identifiers discerned from the code can identify the transaction for generating the current code and the transaction for generating a prior code for the same printer. Discerned transaction identifiers may also include identifiers for subsequent transactions whether or not those transactions have yet occurred.

Thus, each valid code is generated for a particular printer with the printer and transaction identifiers corresponding to that specific printer. As is explained in more detail below, before a printer's credit balance is updated using the credit value discerned from a code, it is first confirmed that the printer and transaction identifiers discerned from the code correspond to identifiers maintained by the printer.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
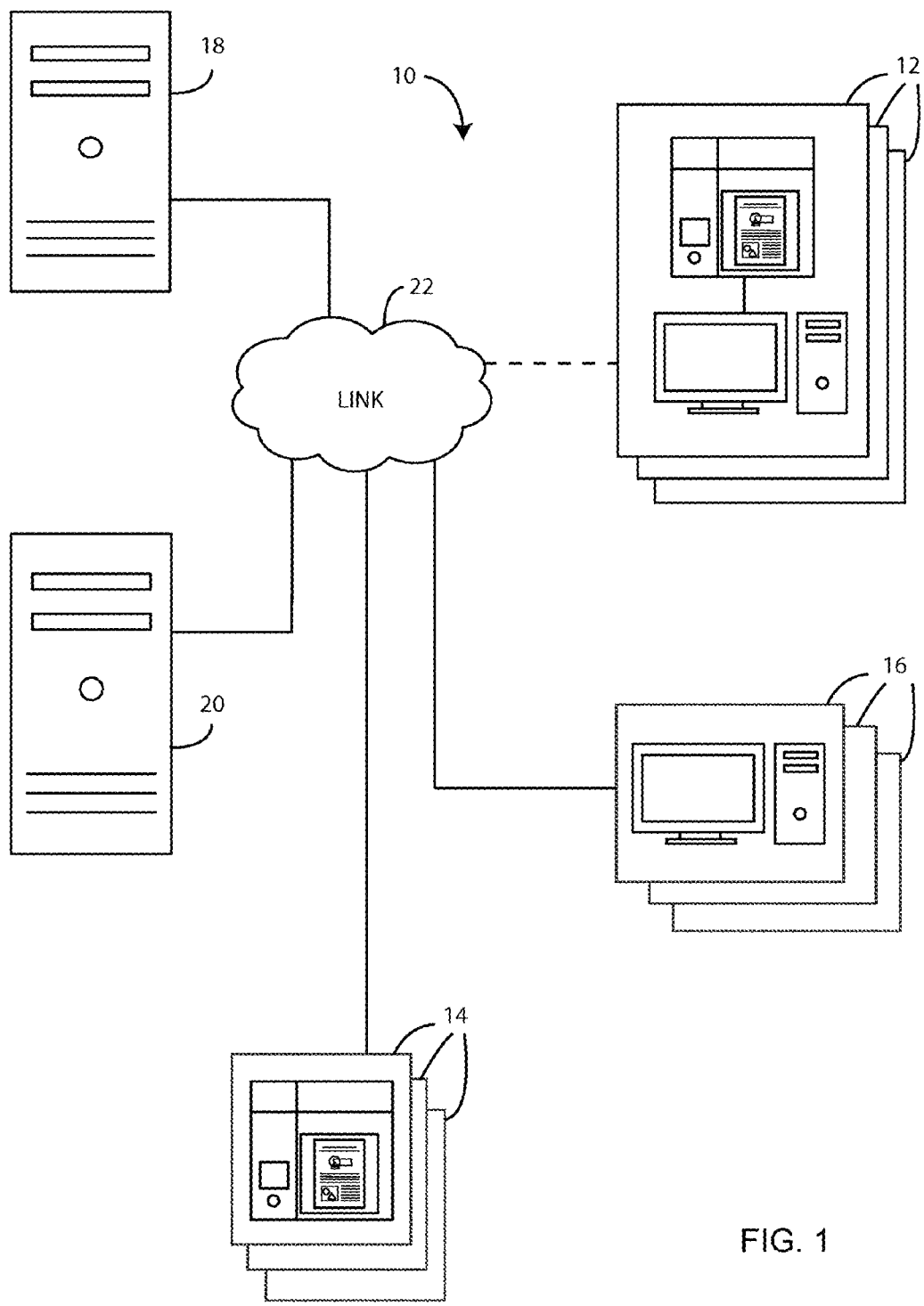
FIG. 1 depicts an exemplary environment in which various embodiments may be implemented.

Environment: FIG. 1 depicts an exemplary environment 10 in which various embodiments may be implemented. Environment 10 is shown to include stand alone print sites 12, network printers 14, network clients 16, print site 18, and credit site 20. Stand alone print sites 12 represent generally any device or combination of devices capable of printing without third party support. Examples include printers with copy capabilities and printers coupled to computers. Stand alone print sites may but need not rely on network resources to produce printed pages.

Network printers 14 represent generally any device capable of producing printed pages from print jobs routed via a network. Network clients 16 represent generally any devices capable of electronic network communication. In particular network clients 16 can include computers running programs for interacting with print site 18 and credit site 20. As will be discussed in more detail, such interaction can include instructing print site 18 to deliver a print job to a selected network printer 14. Other interaction can also include communication with credit site 20 to obtain codes.

Print site 18 represents one or more computing devices capable of receiving and responding to network requests from network clients 16 for the purpose of directing print jobs to network printers 14. Credit site 20 represents one or more computing devices capable of receiving and responding to requests from network clients 16 for the purpose of acquiring credit to be added to a credit balance maintained by stand alone print sites 12 and network printers 14.

Network printers 14, network clients 16, print site 18, and credit site 20 are interconnected via link 22. Link 22 represents generally one or more of a cable, wireless, fiber optic, or remote connections via a telecommunication link, an infrared link, a radio frequency link, or any other connectors or systems that provide electronic communication. Link 22 may include, at least in part, an intranet, the Internet, or a combination of both. Link 22 may also include intermediate proxies, routers, switches, load balancers, and the like. The paths followed by link 22 between components 14-20 as depicted in FIG. 1 represent the logical communication paths between these devices, not necessarily the physical paths between the devices.

Components: FIGS. 2-6 depict example and various physical and logical components for implementing various embodiments. Starting with FIG. 2, a standalone print site 12 is shown to include printer 24 and computer 26. Printer 24 represents a device capable of producing printed output on its own or at the direction of computer 26. Printer 24 is shown to include print engine 28, print manager 30, print interface 32, credit manager 34, and credit interface 36. Print engine 28 represents generally the physical components for forming printed images on a medium such as paper. Such components may be configured to utilize consumable colorants such as ink or toner to produce the printed images.

Print manager 30 represents generally any combination of hardware and programming capable of directing print engine 28 to produce a desired image from a print job. Print interface 32 represents generally any combination of hardware and programming capable of receiving print jobs and forwarding those print jobs on to print manager 30. Print interface 32 may be capable of wired or wireless communication with, in this example, computer 26. Where, for example, printer 24 includes a copy function, print interface 32 may receive print jobs from a scanner (not shown).

Credit manager 34 (described in more detail below with respect to FIG. 3) represents generally a combination of hardware and programming capable of maintaining a credit balance allowing print engine 28 to produce jobs only when the balance is sufficient to cover the cost of producing those jobs. In particular, credit manager 34 deducts from that balance as pages are printed. As will be discussed in more detail below, credit manager 34 increases the credit balance when it receives a code that uniquely identifies printer 24 and specifies the amount of credit to be added. The added credit can be purchased or transferred from another printer. Credit interface 36 represents generally any combination of hardware and programming capable of receiving the codes for credit manager 34. Credit interface 36 may, for example, be capable of receiving the codes electronically via a wired or wireless connection. In such a case, credit interface 36 and print interface 32 may share common components so that a code may be supplied along with or as part of a print job. In another example, credit interface 36 may allow for manual entry of codes through one or more physical controls such as a touch screen or keypad supplied by printer 24. Where a code takes the form of a barcode, credit interface 36 may include a scanner.

Computer 26 represents generally any computing device capable of communicating print jobs to printer 24. In this example, computer 26 is shown to include application 38 and driver 40. Application 38 is responsible for generating a document to be printed. Driver 40 translates the document into a print job formatted for printer 24 and communicates the print job to printer 24.

Printer 14 is shown to include components 28-36 which mirror components 28-36 of printer 24. However, where printer 24 is designed to receive print jobs directly from computer 26, printer 14 is configured to receive print jobs from print site 18 via link 22. Network client 16 is shown to include document 42 and browser 44. Document 42 represents generally any electronic content that can be printed. Various examples include word processing documents, spreadsheets, web pages, and images. Browser 44 is responsible for communicating document to print site 18 for processing so that it may be printed using printer 14.

Print site 18 is shown to include server 46 and print service 48. Server 46 represents generally any combination of hardware and programming capable of receiving and responding to requests originating from client 16. Such communications include receiving and forwarding documents to print service 48. Print service 48 represents generally any combination of hardware and programming capable formatting documents received from client 16 to generate print jobs to be produced by printer 14. Print service 48 may also be responsible for interacting with credit site 20 to provide printer 14 with compensation for producing a print job. The compensation can take the form of a code used by printer to add to its credit balance.

Credit site 20 is shown to include server 50 and credit service 52. Server 50 represents generally any combination of hardware and programming capable of receiving and responding to requests originating from clients 16 and 26 and print site 18. Credit service 52 (described in more detail below with respect to FIG. 5) represents generally any combination of hardware and programming capable of generating codes for use by printers 14 and 24 for adding to their respective credit balances. In the case of printer 14, codes may be delivered electronically needing no user intervention. For printer 24, codes may, for example, be delivered via an e-mail to computer 26. A user can then manually enter the code via credit interface 36 or communicate the code to printer 24 using driver 40.

To summarize, credit site 20 generates codes for use by printers 14 and 24. Printers 14 and 24 utilize the codes to add to their respective credit balances. Printer 14 receives print jobs from client 16 via print site 18. Printer 24 receives print jobs from computer 26. Each print job has an associated cost. Each printer 14 and 24 produces a print job only if it has a sufficient credit balance to cover the cost of the print job. If printed, the cost is deducted from the printer's credit balance. The cost of a print job may be determined as a function of the number of pages. To more accurately correlate the cost to the consumption of colorant, the cost may be determined as a function of the amount of colorant consumed or predicted to be consumed. For ink printing, the cost could then be a function of the number of drops used or expected to be used to produce a print job.

Figure 2:
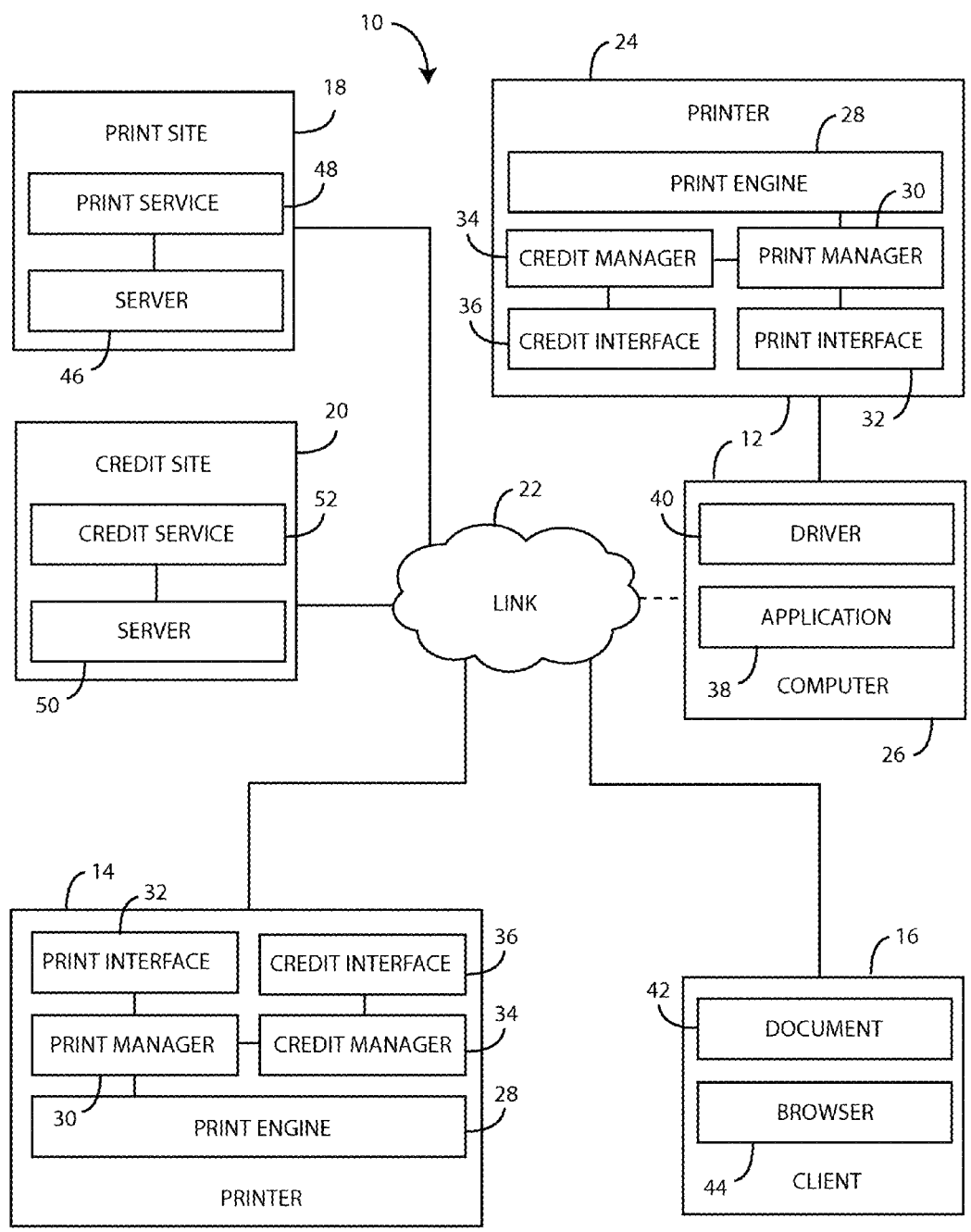
FIGS. 2-6 depict example and various physical and logical components for implementing various embodiments.
Figure 3:
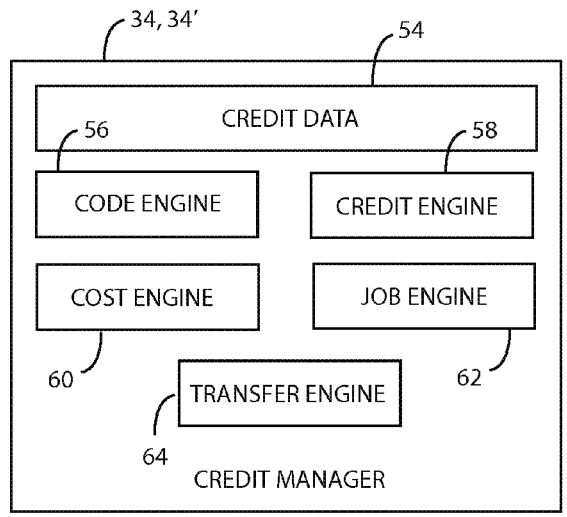
Figure 4:
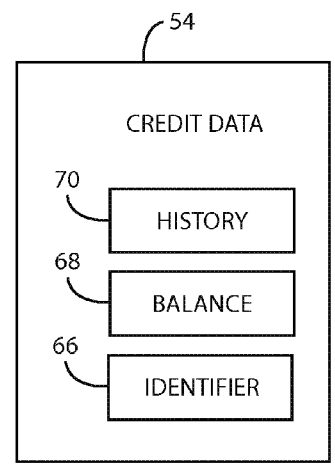

FIGS. 3 and 4 depict exemplary physical and logical components of credit manager 34 of printers 14 and 24 depicted in FIG. 2. As illustrated, credit manager 34 includes credit data 54, code engine 56, credit engine 58, cost engine 60, job engine 62, and transfer engine 64. Credit data 54 represents generally a collection of electronic information used by code engine 56 and credit engine 58 in performance of their respective tasks. Referring to FIG. 4, credit data 54 is shown to include identifier 66, balance 68, and history 70. Identifier 66 represents the unique identifier assigned to the printer. Such may, for example, be a serial number, e-mail address, or other data that distinguishes the printer from other printers. Balance 68 represents the printer's current credit balance. History 70 may include a listing of prior codes and data discerned from those prior codes. Such information, as discussed below, can include transaction identifiers discerned from codes received by a printer as well as a listing of the codes themselves.

Referring to FIG. 3, code engine 56 represents generally any combination of hardware and programming capable of examining a received code to confirm that it has not been previously used by the printer and to discern its various components. To confirm that the code has not been previously used, code engine 56 compares the code against a listing of previous codes contained in history 70. As noted, a code includes a printer identifier, a credit value, and perhaps one or more transaction identifiers. To discern the code components, code engine 56 may decrypt the code. Credit engine 58 represents generally any combination of hardware and programming capable of determining if the printer identifier discerned from a code corresponds to the unique identifier assigned to the printer that received the code. With reference to FIG. 4, only upon a positive determination that the discerned identifier corresponds to identifier 66, credit engine 58 updates balance 68 to include the credit value discerned from the code.

Before updating balance 68, credit engine 58 may first determine if a transaction identifier discerned from the code corresponds to a transaction identifier in history 70. As discussed, a code can be assembled from a printer identifier, a credit value, a past transaction identifier and a current transaction identifier. The current transaction identifier identifies the transaction the occurred when the code was generated for the printer. The past transaction identifier identifies the transaction that occurred when the immediately preceding code was generated for the same printer. Thus, before updating balance 68, credit engine 58 first confirms that the past transaction identifier discerned from the code corresponds to a transaction identifier in history 70. Upon a positive determination, credit engine 58 updates history to include the current transaction identifier discerned from the code. In addition to past and current transaction identifiers, a code can be assembled from one or more future transaction identifiers for a particular printer. So that codes generated for a given printer need not be redeemed in sequence, history 70 may also be updated to include such future transaction identifiers discerned from the code.

Referring again to FIG. 3, cost engine 60 represents generally any combination of hardware and programming capable of determining a job cost for a print job. It is expected that the job cost will be measured in the same manner as the printer's credit balance. Examples previously noted include currency and consumable quantities. Where, for example, the printer utilizes ink, cost engine 60 may examine a print job to calculate the number of ink drops needed to produce the job. From that number, cost engine 60 determines the job cost.

Job engine 62 represents generally any combination of hardware and programming capable of allowing a print job to be produced only if the printer's credit balance exceeds the job cost of the print job. Referring back to FIG. 2, job engine 62 acts as a gate keeper preventing print engine from producing a print job unless the credit balance maintained by printer 14 or 24 is sufficient to cover the job cost. Referring again to FIGS. 3 and 4, if the job is produced, job engine 62 deducts the job cost from balance 68.

Transfer engine 64 represents generally any combination of hardware and programming capable of generating a code allowing a selected portion of a printer's credit balance to be transferred to another printer. Transfer engine 64 generates the code using a printer identifier for the other printer and a transfer value. The other printer's identifier and the code may be received via credit interface 36 (FIG. 2). In the case of printer 24, a user may manually enter the transfer value and identifier via the printer's user interface. For printer 14, the transfer value and identifier may be received electronically from credit site 20. Transfer engine 64 is the responsible for deducting the transfer value from the balance 68 and communicating the code for use by the other printer. The code may be communicated electronically to the other printer via credit site 20. The code may be displayed, printed, or e-mailed so that it may be manually entered into the other computer.

Figure 5:
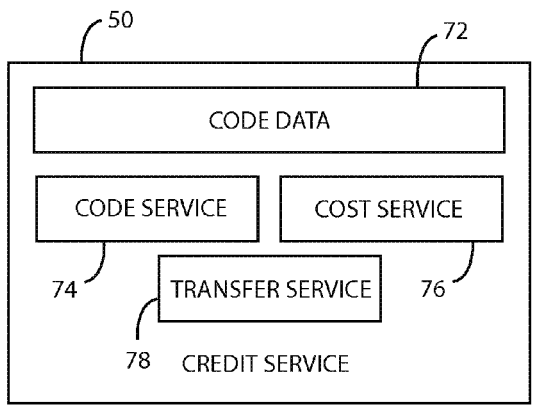
Figure 6:
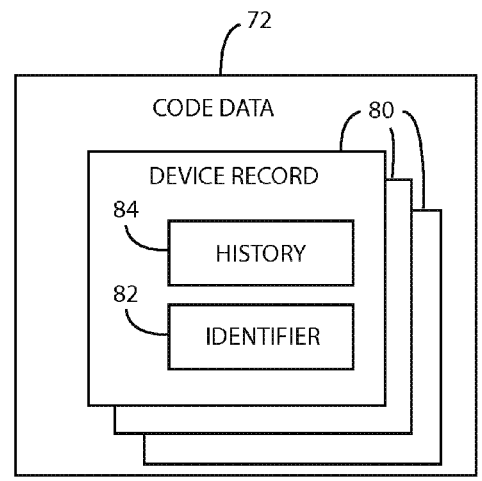

Moving to FIG. 5, credit service 50 is shown to include code data 72, code service 74, cost service 76, and transfer service 78. As explained, credit service 50 is responsible for generating and communicating codes for use by printers 14 and 24 (FIG. 2). Code data represents 72 represents generally a collection of electronic information used by code service 74 in performance of its tasks. Referring to FIG. 6, code data 72 is shown to include a series of device records 80. Each device record 80 corresponds to a printer for which credit manager is configured to generate codes. Each device record 80 includes identifier 82 and history 84. Identifier 66 represents a printer identifier. History 84 may include data used to generate previous and future codes for a corresponding printer. Such data can include transaction identifiers for previously generated codes as well as for yet to be generated codes.

Referring to FIG. 5, code service 74 represents generally any combination of hardware and programming capable of generating codes for printers 14, 24 (FIG. 2). In doing so, code service 74 discerns a credit value and a printer identifier. Code service 74 may discern these items based on information supplied electronically from client 16. Only upon a determination that the printer identifier is valid, code service 74 generates and communicates a code so that the discerned credit value can be added to a credit balance maintained by a corresponding printer. Code service 74 generates the code from the discerned credit value and printer identifier. In the example of FIGS. 5 and 6, a valid printer identifier is one that has a corresponding device record 80, that is, a device record 80 having an identifier 82 that corresponds to the printer identifier discerned by code service 74. As discussed previously, a code can identify past, current, and future transaction identifiers. Code service 74 may generate the code from the credit value, printer identifier, transaction identifiers corresponding to the generation of the current code, the generation of a prior code, and the generation of one or more future codes.

Cost service 76 represents generally any combination of hardware and programming capable of determining a job cost for a print job. As before, it is expected that the job cost will be measured in the same manner as the printer's credit balance. Examples previously noted include currency and consumable quantities. Referring to FIG. 2, the print job in question may be a job print site 18 intends to communicate to printer 14. That print job may originate from a third party, that is, not the owner of printer 14. To compensate the owner, the print job is delivered with a code. The credit value included in that code corresponds to the job cost determined by cost service 76. Printer 14 can then refrain from producing the print job unless and until printer 14 successfully updates its credit balance with that credit value.

As noted a code is generated for a particular printer, in this instance a first printer. Transfer service 78 represents generally any combination of hardware and programming capable of communicating a transfer request to a second printer. The transfer request includes or otherwise identifies the printer identifier for the first printer and a credit value.

In response to the transfer service 78 receives the code from the second printer—the second printer having generated the code utilizing the printer identifier for the first printer and the credit value. Transfer service 64 then communicates the code to the first printer so that the credit value can be added to the credit balance maintained by the first printer.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 7:
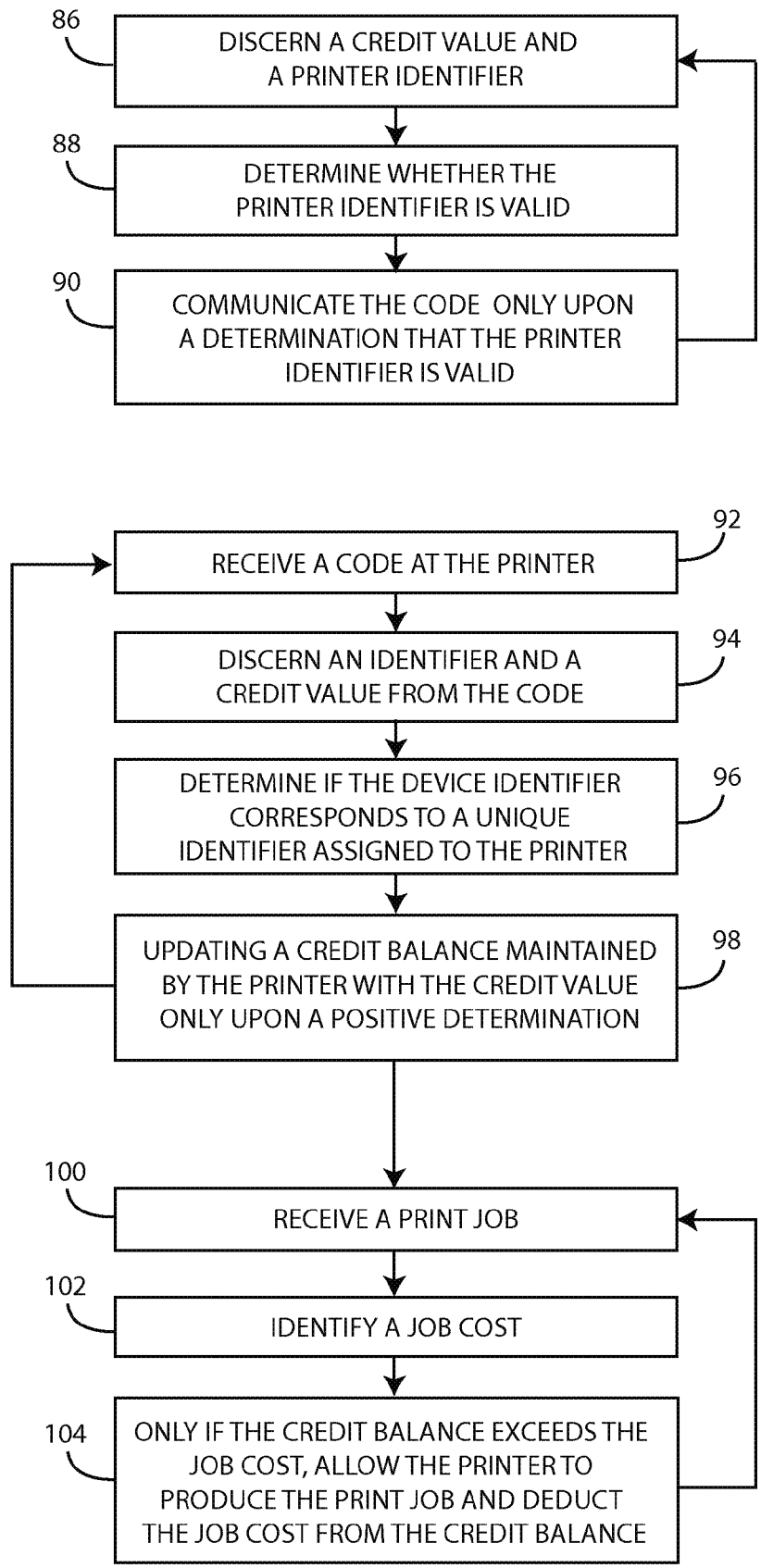
FIGS. 7-9 are exemplary flow diagrams depicting steps taken to implement various embodiments.
Figure 8:
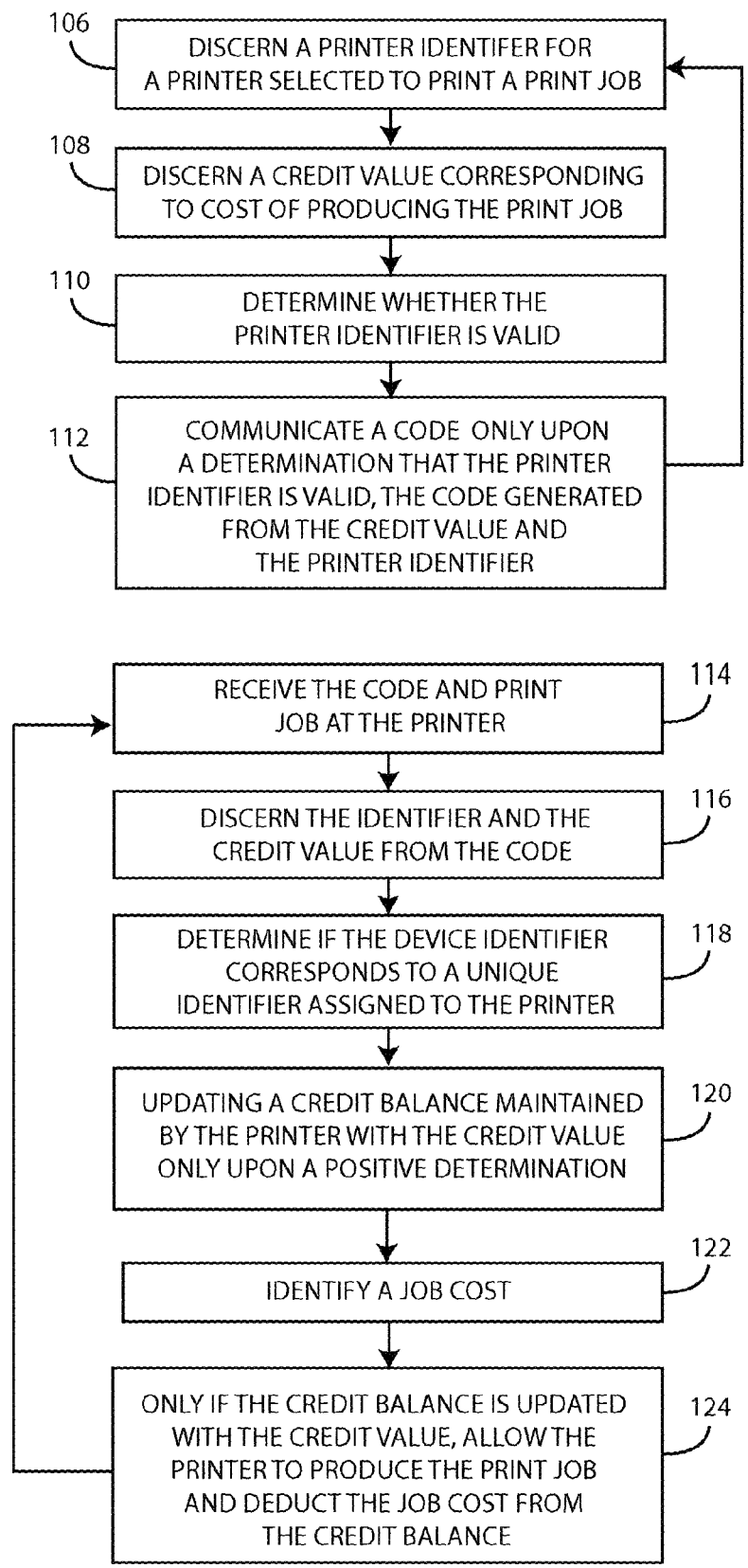
Figure 9:
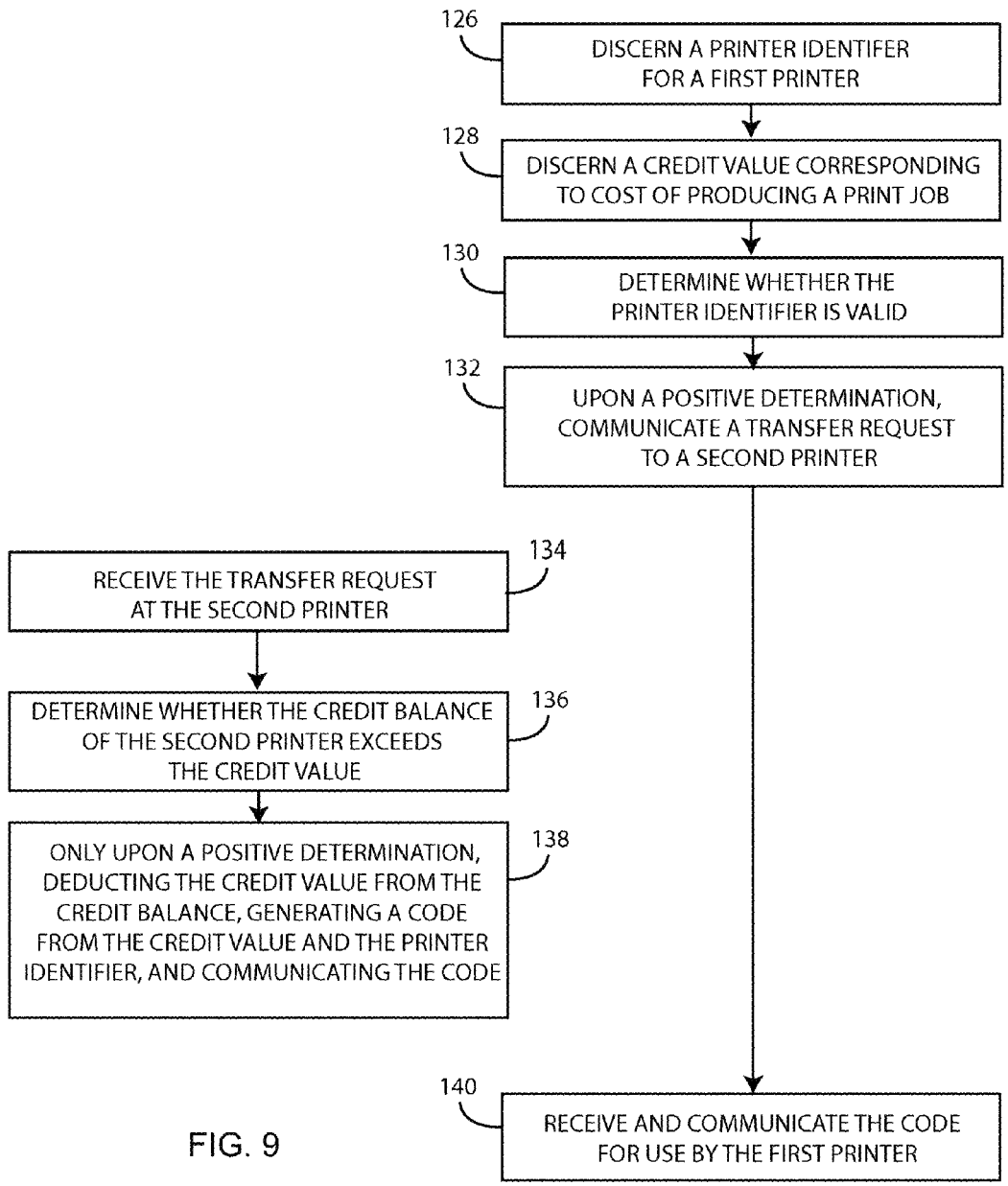

Operation: FIGS. 7-9 depict exemplary flow diagrams of steps taken to implement various embodiments. FIG. 7 depicts exemplary steps 86-104 taken to add credit to a printer's balance so that the printer may later produce a print job. FIG. 8 depicts exemplary steps taken to add credit to a printer's credit balance where that credit corresponds to the production of a particular print job. FIG. 9 depicts steps taken to transfer credit from one printer to compensate for the production of a print job. To provide context, without limitation, reference may be made to the various components of FIGS. 1-6 when discussing FIGS. 7-9. It is to be understood that the methods of FIGS. 7-9 may be implemented using components other than those of FIGS. 1-6.

Starting with FIG. 7, steps 86-90 correspond to the generation of a code. Steps 92-98 correspond to the printer's redemption of the code. Steps 100-104 correspond to the production of the print job. Initially, a credit value and a printer identifier are discerned (step 86). A determination is made as to whether or not the discerned printer identifier is valid (step 88). Only upon a determination that the printer identifier is valid, a code is communicated so that the credit value can be added to a credit balance maintained by the printer (step 90). The code is generated from the discerned printer identifier and credit value.

Referring back to FIGS. 1-6, steps 86-90 may be performed at credit site 20 and in particular by credit service 52. In step 86, the printer identifier may be discerned directly based upon user input or indirectly from a user profile. Similarly, the credit value may be discerned directly from user input or indirectly based on factors discerned, for example, from a cost of producing a print job or a user profile or history. In step 88, credit service 52 may make the validity determination may be made by comparing the discerned printer identifier with records maintained by credit site 20. Credit service 52 may communicate the code electronically directly to printer 14 not relying on user intervention. Instead, credit service 52 may communicate the code via an e-mail, display, or other means that enables a user to input the code into printer 24.

In addition to the credit value and the printer identifier, the code may be generated from transaction identifiers. As previously discussed, a transaction identifier identifies a transaction corresponding to the generation of a code. Such may be for the generation of a prior code, the current code, or even a future code. Credit service 52, as discussed, maintains history 84 for each printer to which it supplies codes. That history 84 identifies these transaction identifiers. So, upon successful communication of a code in step 90, credit service 52 updates history 84 so that history 84 identifies the current transaction identifier for the current code as a previous transaction identifier for use in generating a subsequent code. Credit service 52 may also update history 84 so that history 84 identifies a future transaction identifier included in the current code as a current transaction identifier for that subsequent code.

In some cases, credit service 52 generates the code. In others, the credit value included in the code is transferred from another printer. Here, credit service 52 sends a transfer request to that other printer after the printer identifier is validated. The transfer request includes the printer identifier and the credit value. The other printer, using data from the transfer request generates and returns the code to credit service 52. Only upon receiving the code from the other printer does credit service 52 communicate the code in step 90.

The code communicated in step 90 is received at the printer (step 92). After confirming that the code is new (not previously redeemed), the credit value and printer identifier are discerned from the code (step 94). A determination is made as to whether the printer identifier corresponds to a unique identifier assigned to the printer (96). Only upon a positive determination in step 96, a credit balance maintained by the printer is updated to include the credit value (step 98). Referring back to FIGS. 1-6, steps 92-98 may be performed at printer 14 or printer 24 and in particular by credit manager 34.

As discussed, credit manager 34 maintains credit data 54 with includes identifier 66, balance 68 and history 70. In addition to the printer identifier and credit value, credit manager 34 may discern transaction identifiers from the code received in step 92. As noted, the transaction identifiers can include a transaction identifier corresponding to the current code, a transaction identifier corresponding to a previous code generated for the printer, and a transaction identifier for a subsequent code that may or may not have been generated. Credit manager 34 updates the printer credit balance in step 98 only after first determining that a prior transaction identifier discerned from the code corresponds to a transaction identifier found in history 70. Upon a positive determination, credit manager 34 updates history 70 (the transaction identifier maintained by the printer) to include the current and any future transaction identifiers discerned from the code.

Continuing with FIG. 7, a print job is received (step 100). A job cost for the print job is identified (step 102). Only if the printer's credit balance exceeds the job cost, the printer is allowed to produce the print job and the job cost is deducted from the printer's credit balance (step 104). Referring to FIG. 2, print manager 30 and print interface are responsible for step 100. Cost engine 60 (FIG. 3) is responsible for step 102, while job engine 62 is responsible for step 104.

Moving on to FIG. 8, steps 106-112 correspond to the generation of a code that supplies a credit value corresponding to the production of a print job. Steps 114-124 correspond to the redemption of that code and subsequent print job production. Initially, a printer identifier for a printer selected to produce a print job is discerned (step 106). A credit value corresponding to the cost of producing the print job by that printer is discerned (step 108). A determination is made as to whether or not the discerned printer identifier is valid (step 110). Only upon a determination that the printer identifier is valid, a code is communicated so that the credit value can be added to a credit balance maintained by the printer (step 112). The code is generated from the discerned printer identifier and credit value.

Referring back to FIGS. 1-6, steps 106-112 may be performed at credit site 20 and in particular by credit service 52. In step 106, the printer identifier may be discerned directly based upon user input or indirectly from a user profile. The credit value may be discerned in step 108 based on an analysis of the print job. For example, where ink printer is selected to print, the credit value may be based on an expected number of drops needed to produce the print job. In step 110, credit service 52 may make the validity determination may be made by comparing the discerned printer identifier with records maintained by credit site 20. Credit service 52 may communicate the code electronically directly to printer 14 not relying on user intervention. Instead, credit service 52 may communicate the code via an e-mail, display, or other means that enables a user to input the code into printer 24.

The code communicated in step 112 is received at the printer along with a print job (step 114). After confirming that the code is new, not previously redeemed, the credit value and printer identifier are discerned from the code (step 116). A determination is made as to whether the printer identifier corresponds to a unique identifier assigned to the printer (118). Only upon a positive determination in step 118, a credit balance maintained by the printer is updated to include the credit value (step 120). A job cost for the print job is identified (step 122). Only if the printer's credit balance exceeds the job cost, the printer is allowed to produce the print job and the job cost is deducted from the printer's credit balance (step 124). Further, the job cost identified in step 122 may be less than the credit value included in the code. Such a difference may be appropriate when compensating a printer owner for a third party's use of the printer.

Referring to FIG. 2, print manager 30 and print interface 32 are responsible for receiving the print job in step 114, while credit manager 34 and credit interface 36 receive the code. Note that printer interface 32 and credit interface 36 may be the same interface. Referring to the components of credit manager 34 depicted in FIG. 3, credit engine 58 may implement steps 118 and 120. Cost engine 60 is responsible for step 122, while job engine 62 is responsible for step 124.

Moving to FIG. 9, the credit value included in a code represents credit transferred from one printer to be redeemed at another. Initially, a printer identifier for a first printer selected to produce a print job is discerned (step 126). A credit value corresponding to the cost of producing the print job by that printer is discerned (step 128). A determination is made as to whether or not the discerned printer identifier is valid (step 130). Only upon a determination that the printer identifier is valid, a transfer request is communicated to a second printer (step 132).

The request is received at the second printer (step 134). It is determined if the credit balance maintained by the second printer equals or exceeds the credit value (step 136). Only upon a positive determination, the credit value is deducted from the credit balance of the second printer, a code is generated from the credit value and the printer identifier for the first printer, and the code is communicated (step 138). Step 138 can include communicating the code form the second printer to credit site 20 (FIG. 2). Print site then communicates the code for use by the first printer (step 140).

Figure 10:
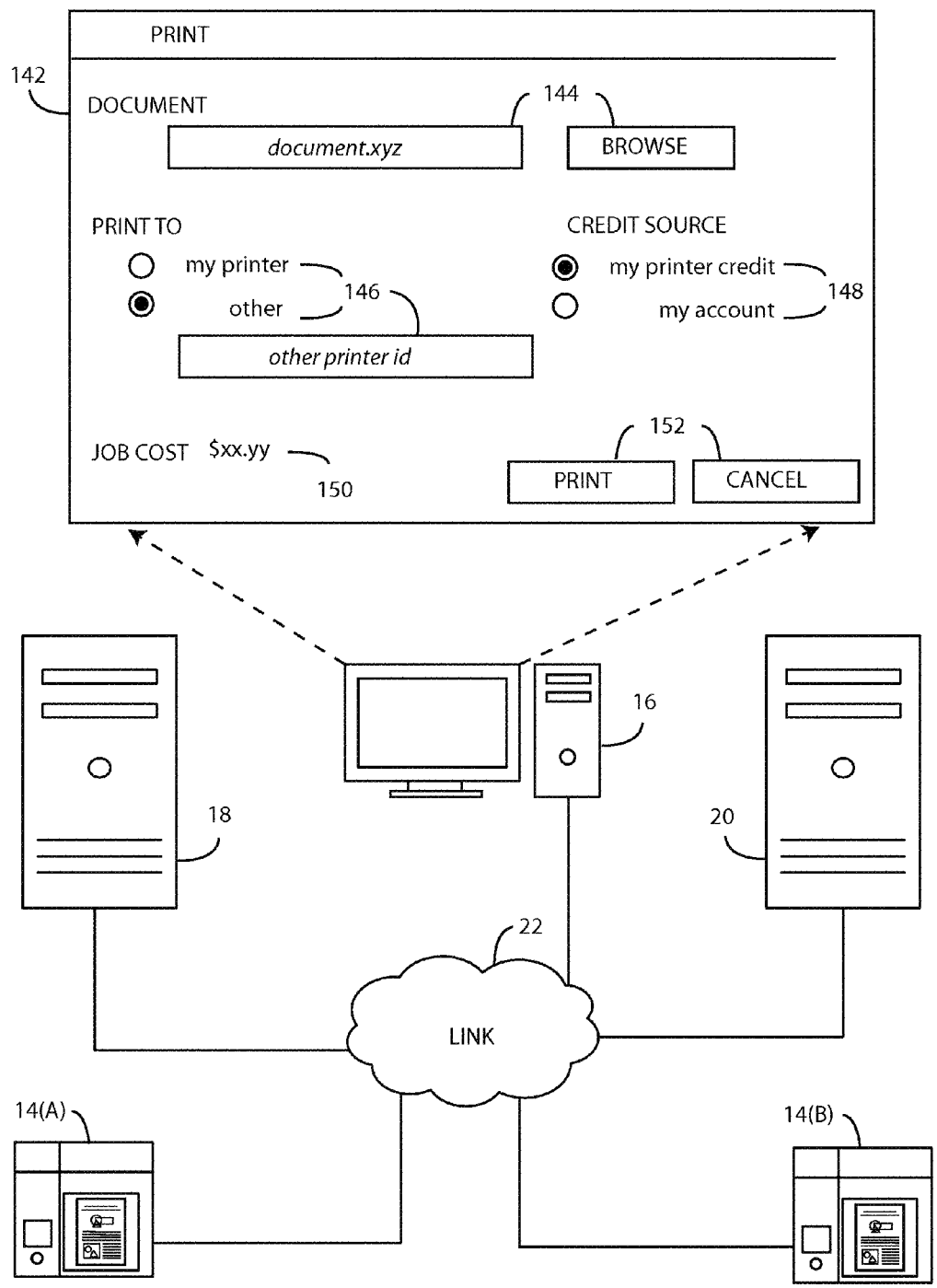
FIG. 10 depicts an exemplary screen interface for directing the production of a print job according to an embodiment.

FIG. 10 illustrates an example in which a credit is transferred from the credit balance of one printer 14(B) to the credit balance of another printer 14(A) to compensate for the production of a print job. In FIG. 10, a user of client 16 has accessed print site 18. Print site 18 has returned an interface 142 with controls 144-152 allowing the user to select and print a document. Controls 144 allow the user to selecting a document. Controls 146 allow the user to select a printer for printing that document. Presumably, the user logged into print site 18 so the user's printer could be identified from the user's profile. Here the user has selected to enter an identifier for another printer—the identifier for printer 14(A).

Controls 148 allow a user to specify a credit source for use in "paying" for the print job. Here the user has chosen to debit the credit balance maintained by their printer—printer 14(B). Control 150 specifies a job cost for printing the selected document. This job cost will be deducted from the credit balance of printer 14(B). Controls 152 allow the user to execute or cancel the printing of the document. Upon execution, print site coordinates with credit site 20 to transfer credit from the credit balance of printer 14(*b*) into the credit balance of printer 14(A). Print site 18 communicates a print job for the selected document to printer 14(A). Printer 14(A) produces the print job using the transferred credit.

Conclusion: The diagrams of FIGS. 1-7 show the architecture, functionality, and operation of various embodiments. Various components illustrated in FIGS. 1-7 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 7-9 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An article comprising a machine-readable storage medium storing instructions that upon execution cause a processor to:
   receive a first print job at a printer;
   identify a job cost for the first print job;

determine whether the job cost for the first print job exceeds a credit balance of the printer, wherein the credit balance is maintained by the printer; and in response to a determination that the job cost for the first print job does not exceed the credit balance of the printer:
- deduct the job cost for the first print job from the credit balance of the printer, and
- allow the printer to produce the first print job.

2. The article of claim 1, wherein the instructions further cause the processor to:
in response to a determination that the job cost for the first print job exceeds the credit balance of the printer, not allow the printer to produce the first print job.

3. The article of claim 1, wherein the instructions further cause the processor to:
receive a code at the printer;
determine whether the code is associated with an identifier of the printer; and
in response to a determination that the code is associated with the identifier of the printer:
- determine a credit value using the code; and
- update the credit balance of the printer to include the credit value.

4. The article of claim 3, wherein the code is received with or as part of the print job.

5. The article of claim 3, wherein the code includes the credit value and the identifier of the printer.

6. The article of claim 3, wherein the printer is a first printer, wherein the code is provided by a second printer, and wherein the credit value is a transfer from a credit balance of the second printer to the credit balance of the first printer.

7. The article of claim 1, wherein the job cost for the first print job is determined as a function of an amount of colorant required to produce the first print job.

8. A method, comprising:
for each print job received at a printer:
- discerning, by the printer, a job cost for the print job;
- determining, by the printer, whether the job cost exceeds a credit balance of the printer, wherein the credit balance is maintained by the printer;
- in response to a determination that the job cost does not exceed the credit balance of the printer, producing the print job and deducting the job cost from the credit balance of the printer.

9. The method of claim 8, wherein:
receiving a code at the printer;
from the code, discerning a printer identifier and a credit value;
determining whether the printer identifier corresponds to a unique identifier assigned to the printer;
in response to a determination that the printer identifier corresponds to the unique identifier assigned to the printer, updating the credit balance of the printer to include the credit value.

10. The method of claim 9, wherein the code is generated from the printer identifier assigned to the printer, the credit value, a previous transaction identifier for the printer, and a current transaction identifier.

11. The method of claim 9, wherein the printer is a first printer, the method further comprising:
communicating a transfer request to a second printer, the transfer request identifying the printer identifier for the first printer and the credit value; and
receiving the code from the second printer, the code having been generated at the second printer utilizing the printer identifier for the first printer and the credit value.

12. The method of claim 11, wherein the credit value is to be transferred from a credit balance of the second printer to the credit balance of the first printer.

13. The method of claim 8, wherein discerning the job cost for the print job comprises determining an amount of colorant required for the print job.

14. A printer, comprising:
a print interface to receive a plurality of print jobs; and
a credit manager to:
- maintain a credit balance for the printer;
- determine a job cost for each print job of the plurality of print jobs; and
a print engine to, for each print job of the plurality of print jobs:
- produce the print job if the job cost for the print job does not exceed the credit balance of the printer.

15. The printer of claim 14, wherein the credit manager is further to, for each print job of the plurality of print jobs:
deduct the job cost for the print job from the credit balance if the print job is produced.

16. The printer of claim 14, wherein the credit manager is further to, for each print job of the plurality of print jobs:
not allow the print engine to produce the print job if the job cost for the print job exceeds the credit balance of the printer.

17. The printer of claim 14, wherein the credit manager is further to:
receive a code including a printer identifier and a credit value; and
in response to a determination that the printer identifier corresponds to the printer, increase the credit balance of the printer by an amount of the credit value.

18. The printer of claim 17, wherein the credit value is transferred from a credit balance of a second printer.

19. The printer of claim 17, wherein the code is generated using the credit value and the printer identifier assigned to the printer.

20. The printer of claim 14, wherein the credit manager is to determine the job cost for each print job based on an amount of colorant required by each print job.

* * * * *